US012657926B2

(12) United States Patent
Akimoto

(10) Patent No.: US 12,657,926 B2
(45) Date of Patent: Jun. 16, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yoshiyuki Akimoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 131 days.

(21) Appl. No.: 17/968,851

(22) Filed: Oct. 19, 2022

(65) Prior Publication Data

US 2023/0134579 A1      May 4, 2023

(30) Foreign Application Priority Data

Oct. 29, 2021      (JP) ................................. 2021-177623

(51) Int. Cl.
        G06V 20/58          (2022.01)
        G06T 5/80            (2024.01)
                        (Continued)

(52) U.S. Cl.
        CPC ................ G06V 20/58 (2022.01); G06T 5/80 (2024.01); G06T 7/62 (2017.01); G06V 10/25 (2022.01);
                        (Continued)

(58) Field of Classification Search
        None
        See application file for complete search history.

(56) References Cited

U.S. PATENT DOCUMENTS

2003/0076414 A1      4/2003   Sato et al.
2009/0079553 A1*     3/2009   Yanagi ...................... B60R 1/26
                                                        348/148

(Continued)

FOREIGN PATENT DOCUMENTS

JP        2008123215 A      5/2008
JP        2018129668 A      8/2018

(Continued)

OTHER PUBLICATIONS

Japanese Office Action issued May 7, 2024, in corresponding Japanese Patent Application No. 2021-177623, with English translation (8 pages).

*Primary Examiner* — Benjamin R Bruckart
*Assistant Examiner* — Charles N Hicks
(74) *Attorney, Agent, or Firm* — Venable LLP

(57)                ABSTRACT

An image processing apparatus includes an imaging device including an optical system for forming an optical image including a low-distortion region and a high-distortion region on a light receiving surface and configured to generate an image signal of a side behind a moving apparatus, an image processing unit configured to generate image data from the image signal generated by the imaging device, a detection unit configured to detect another moving apparatus on a lateral side behind the moving apparatus, and a display control unit configured to cause the image data in a predetermined cut region, including the high-distortion region including the other moving apparatus behind on the lateral side to be displayed, in a case when the other moving apparatus behind on the lateral side is detected by the detection unit. The detection unit detects a size of the other moving apparatus, and the cut region size is changed.

19 Claims, 10 Drawing Sheets

(51) Int. Cl.
_G06T 7/62_ (2017.01)
_G06V 10/25_ (2022.01)

(52) U.S. Cl.
CPC ............... *G06T 2207/30252* (2013.01); *G06V 2201/07* (2022.01)

(56) References Cited

U.S. PATENT DOCUMENTS

| | | | |
|---|---|---|---|
| 2016/0187487 A1* | 6/2016 | Itoh ......................... | G01S 17/58 356/4.01 |
| 2017/0015248 A1* | 1/2017 | Baur .......................... | B60R 1/06 |
| 2018/0197411 A1* | 7/2018 | Shimizu ............... | G06V 20/584 |
| 2019/0052843 A1* | 2/2019 | Izumi ........................ | B60R 1/26 |
| 2019/0191107 A1* | 6/2019 | Claezon ................... | H04N 7/18 |
| 2020/0238909 A1* | 7/2020 | Yamamoto ................ | B60R 1/28 |
| 2021/0233290 A1* | 7/2021 | Shimazu ............ | B62D 15/0295 |

FOREIGN PATENT DOCUMENTS

| | | |
|---|---|---|
| JP | 2020170341 A | 10/2020 |
| WO | 2018/207393 A1 | 11/2018 |

* cited by examiner

FIG. 8

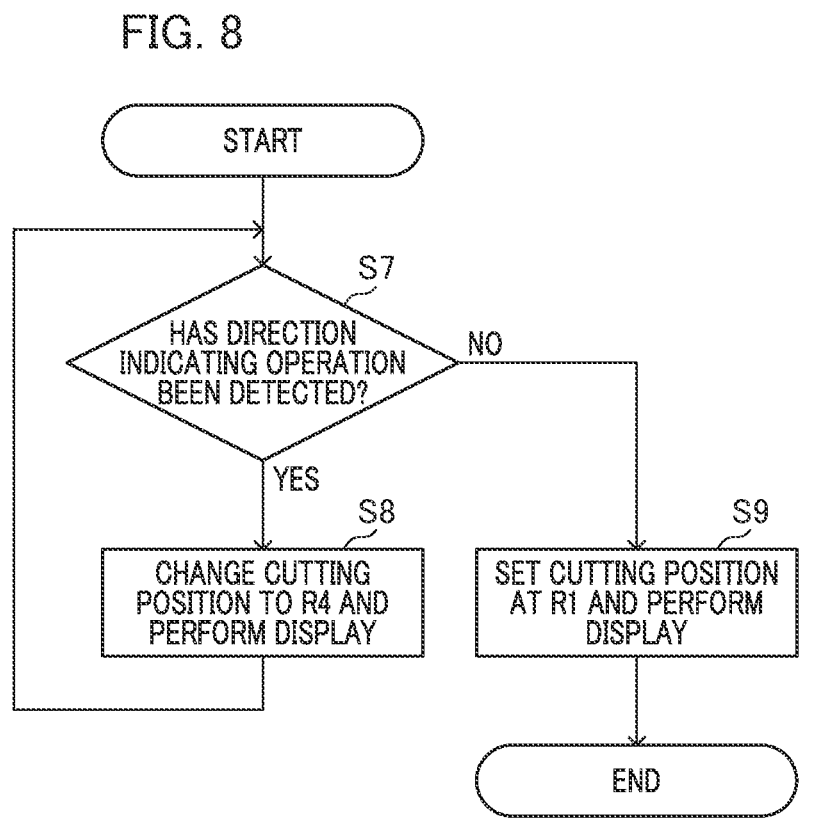

START

S7

HAS DIRECTION
INDICATING OPERATION
BEEN DETECTED?

NO

YES

S8

CHANGE CUTTING
POSITION TO R4 AND
PERFORM DISPLAY

S9

SET CUTTING POSITION
AT R1 AND PERFORM
DISPLAY

END

IMAGE PROCESSING APPARATUS, IMAGE PROCESSING METHOD, AND STORAGE MEDIUM

BACKGROUND OF THE INVENTION

Cross Reference to Priority Application

This application claims the benefit of Japanese Patent Application No. 2021-177623 filed on Oct. 29, 2021, which is hereby incorporated by reference herein in its entirety.

FIELD OF THE INVENTION

The present invention relates to an image processing apparatus, an image processing method, and a storage medium capable of displaying lateral sides behind a moving apparatus.

DESCRIPTION OF THE RELATED ART

International Patent Publication No. WO18/207393 describes a method of capturing a wide-angle image at the time of backward traveling and capturing a high-resolution, high-frame-rate image of a side behind a vehicle during ordinary traveling with a narrower angle of view than the wide angle, using an imaging device adapted to acquire a plurality of angles of view.

However, the device in the WO18/207393 publication has a problem that it is not possible to take advantage of most of the acquired image at the wide angle since only the side behind the vehicle itself is the target of imaging during ordinary traveling while an image at the wide angle is acquired at the time of backward traveling. Additionally, there is a problem that it is not easy to visually recognize the lateral sides behind the vehicle itself with side mirrors.

SUMMARY OF THE INVENTION

In order to solve the aforementioned problem, an image processing apparatus according to an aspect of the present invention includes an imaging device including an optical system for forming an optical image including a low-distortion region and a high-distortion region on a light receiving surface and configured to generate an image signal of a side behind a moving apparatus, and at least one processor or circuit configured to function as an image processing unit configured to generate image data from the image signal generated by the imaging device, a detection unit configured to detect another moving apparatus on a lateral side behind the moving apparatus, and a display control unit configured to cause the image data in a predetermined cut region including the high-distortion region including the another moving apparatus behind on the lateral side to be displayed in a case when the moving apparatus behind on the lateral side is detected by the detection unit.

Further features of the present invention will become apparent from the following description of exemplary embodiments with reference to the attached drawings.

BRIEF DESCRIPTION OF THE DRAWINGS

FIG. 8 is a flowchart illustrating control for changing a cutting position in an image when an operation of a direction indicator has been detected according to the fourth embodiment.

DESCRIPTION OF THE EMBODIMENTS

Hereafter, with reference to the accompanying drawings, favorable modes of the present invention will be described using Embodiments. In each diagram, the same reference signs are applied to the same members or elements, and a duplicate description will be omitted or simplified.

First Embodiment

Hereafter, a first embodiment will be described in detail with reference to the drawings. It is necessary to use an imaging device for capturing an image behind on a lateral side and a detection unit for detecting a vehicle 310 behind on the lateral side in order to check a vehicle at a blind angle part when the vehicle is difficult to be checked with a side mirror, such as a lateral side behind the vehicle itself. In the first embodiment, a method of displaying a vehicle, which is another moving apparatus, in a blind angle part, such as on a lateral side behind the vehicle, in which it is difficult to see a vehicle with a side mirror, merely by using an imaging apparatus for imaging the side behind the vehicle itself will be described.

Figure 1:
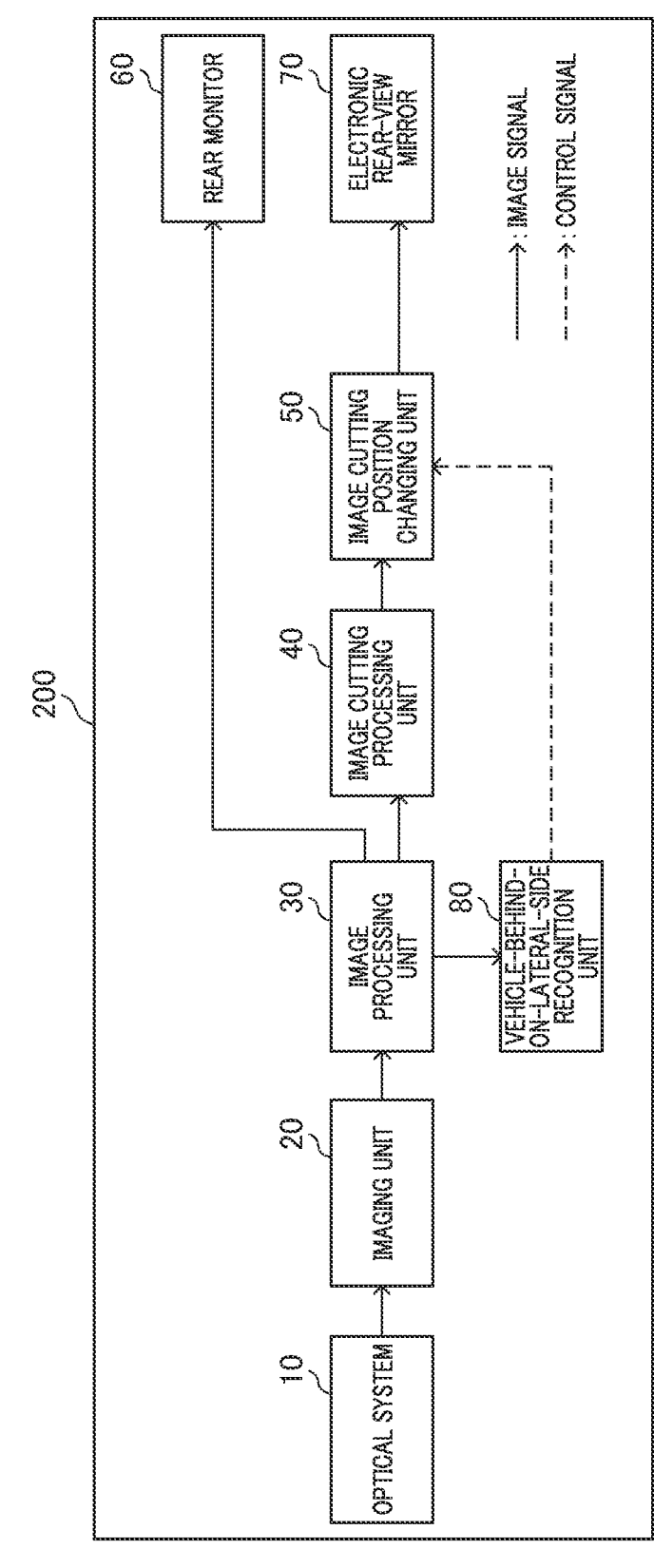
FIG. 1 is a block diagram for explaining a configuration example of an image processing apparatus 200 according to a first embodiment.

FIG. 1 is a block diagram for explaining a configuration example of an image processing apparatus 200 according to the first embodiment. Note that one or more components illustrated in FIG. 1 may be realized by hardware such as an ASIC or a programmable logic array (PLA).

The same applies to FIGS. 5, 6, 7, and 9, which will be described later. A computer (such as a central processing unit (CPU) or a microcomputer) included in the image processing apparatus 200 functions as a control unit for controlling operations of each component in the apparatus 200 on the basis of a computer program stored in a storage medium.

In the first embodiment, the image processing apparatus 200 is an image processing unit mounted on a rear side of the vehicle (moving apparatus) itself, which is not illustrated, and configured to display an image captured by an imaging device for capturing a rear-side image on a display device in the vehicle, for example.

The image processing apparatus 200 includes an optical system 10, an imaging unit 20, an image processing unit 30, an image cutting processing unit 40, an image cutting position changing unit 50, a rear monitor 60, an electronic rear-view mirror 70, and a vehicle-behind-on-lateral-side recognition unit 80. Note that the optical system 10 and the imaging unit 20 are mounted to face the side behind the vehicle itself to image the side behind the vehicle itself as a moving apparatus. The electronic rear-view mirror 70 is a display device such as an LCD or an OLED for displaying a rear-view image.

The optical system 10 is configured to be able to obtain a high-definition image at a narrow angle of view 11a around an optical axis using a combination of a plurality of lenses, for example, and be able to obtain an image captured with low resolution with a wide angle of view 11b including the narrow angle of view 11a. For example, the optical system 10 can form an optical image including a low-distortion region and a high-distortion region on a light receiving surface of the imaging unit 20.

The wide angle of view 11b is suitable for imaging the side behind the vehicle itself at a wide angle at the time of backward traveling or the like. Also, it is possible to image a vehicle on the lateral side behind the vehicle itself at a part corresponding to a blind angle where it is difficult to recognize the vehicle with a side mirror. The narrow angle of view 11a can be used to observe a vehicle 300 on the side behind the vehicle itself with high resolution at the time of ordinary traveling.

The imaging unit 20 is an imaging element (such as a CCD image sensor or a CMOS image sensor), converts an optical object image formed by the optical system 10 into imaged signal, and transmits the image data to the image processing unit 30.

For example, the imaging unit 20 including the optical system functions as an imaging device that executes an imaging step of imaging the side behind the moving apparatus using the optical system that forms an optical image including a low-distortion region and a high-distortion region on the light receiving surface.

Figures 2A, 2B:
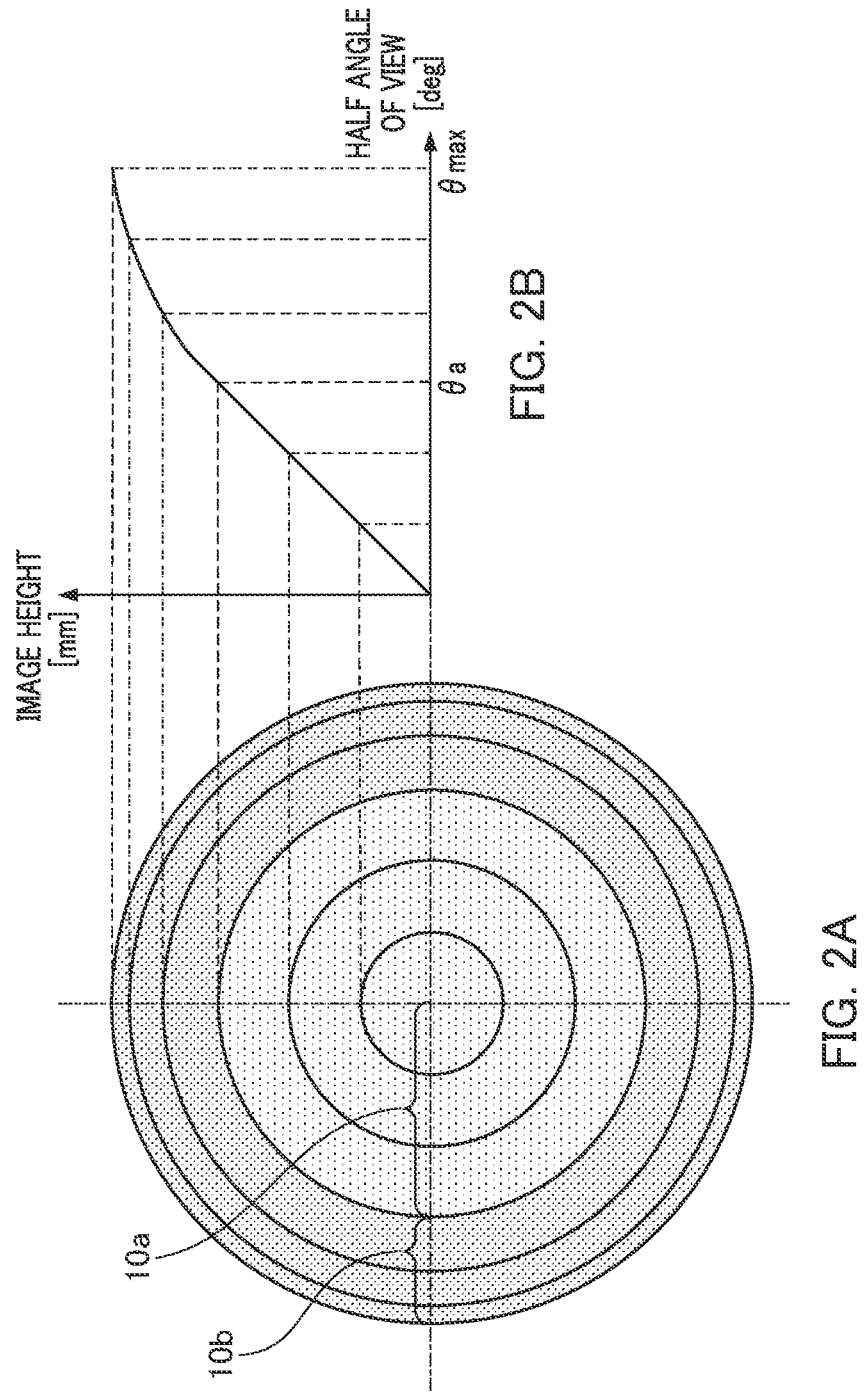
FIG. 2A is a diagram illustrating, as a contour line, an image height y at each half angle of view on a light receiving surface of an imaging element of an optical system 10.
FIG. 2B is a diagram representing a projection property representing a relationship between the image height y and a half angle of view θ of the optical system 10.

Optical properties of the optical system 10 will be described with reference to FIGS. 2A and 2B. FIG. 2A is a diagram illustrating, as a contour line, an image height y at each half angle of view on the light receiving surface of the imaging element included in the imaging unit 20.

FIG. 2B is a diagram representing a projection property representing a relationship between the image height y and the half angle of view $\theta$ of the optical system 10. In FIG. 2B, the half angle of view (the angle formed by the optical axis and the incident light beam) $\theta$ is represented by the horizontal axis, and the image height y on the light receiving surface (image surface) of the imaging element included in the imaging unit 20 is represented by the vertical axis.

The optical system 10 is configured such that the projection property y($\theta$) differs in a region of less than a predetermined half angle of view $\theta$a and a region of equal to or greater than the half angle of view $\theta$a as illustrated in FIG. 2B. Therefore, a resolution differs depending on a region when the amount of increase in image height y with respect to the half angle of view $\theta$ per unit is referred to as the resolution.

It is also possible to state that the local resolution is represented by a differential value dy($\theta$)/d$\theta$ at the half angle of view $\theta$ of the projection property y($\theta$). For example, it is possible to state that the resolution increases as a gradient of the projection property y($\theta$) in FIG. 2B increases. Additionally, it is also possible to state that the resolution increases as the interval of the image height y at each half angle of view of the contour line in FIG. 2A increases.

In the first embodiment, the region near the center generated on the light receiving surface of the imaging element when the half angle of view $\theta$ is less than the predetermined half angle of view $\theta$a will be referred to as a high-resolution region 10a, and the region near the outside where the half angle of view $\theta$ is equal to or greater than the predetermined half angle of view $\theta$a will be referred to as a low-resolution region 10b.

The angle of view of the high-resolution region 10a corresponds to the aforementioned narrow angle of view 11a, and the angle of view obtained by adding the angle of view of the high-resolution region 10a and the angle of view of the low-resolution region 10b corresponds to the wide angle of view 11b for imaging.

Also, in the first embodiment, the high-resolution region 10a is a low-distortion region where the amount of distortion is relatively low, and the low-resolution region 10b is a high-distortion region where the amount of distortion is relatively great. Therefore, the high-resolution region and the low-resolution region may be referred to as a low-distortion region and a high-distortion region, respectively, in the first embodiment.

The optical system 10 is configured such that the projection property y($\theta$) thereof is greater than f×$\theta$ (f is a focal distance of the optical system 10) in the high-resolution region (low-distortion region) 10a. Also, the projection property y($\theta$) in the high-resolution region (low-distortion region) is set to be different from the projection property in the low-resolution region (high-distortion region).

In a case when $\theta$ max denotes the maximum half angle of view that the optical system 10 has, it is desirable that a ratio $\theta$a/$\theta$ max between a and $\theta$ max be equal to or greater than a predetermined lower limit value and that the predetermined lower limit value be 0.15 to 0.16, for example.

Also, it is desirable that the ratio $\theta$a/$\theta$ max between $\theta$a and $\theta$ max be equal to or less than a predetermined upper limit value and that the upper limit value be 0.25 to 0.35, for example. In a case when Oa is 90°, the predetermined lower limit value is 0.15, and the predetermined upper limit value is 0.35, for example, it is desirable to determine Oa within a range of 13.5 to 31.5°.

Furthermore, the optical system 10 is configured such that the projection property y($\theta$) also satisfies Expression 1 below.

$$1 < \frac{f \times \sin\theta_{max}}{y(\theta_{max})} \leq A \qquad \text{[Expression 1]}$$

Here, f is a focal distance of the optical system 10 as described above, and A is a predetermined constant. It is possible to obtain a higher center resolution than that of a fisheye lens of the orthographic projection scheme (y=f×sin $\theta$) having the same maximum image formation height by setting the lower limit value to one, and it is possible to maintain satisfactory optical performance while obtaining an angle of view that is equivalent to that of the fisheye lens by setting the upper limit value to A. It is only necessary to determine the predetermined constant A in consideration of a balance of the resolution between the high-resolution region and the low-resolution region, and it is desirable that the predetermined constant A be 1.4 to 1.9.

It is possible to obtain a high resolution in the high-resolution region 10a and to reduce the amount of increase in image height y with respect to the half angle of view θ per unit and to image a wider angle of view in the low-resolution region 10b, by configuring the optical system 10 as described above. Therefore, it is possible to achieve the wide angle of view that is equivalent to that of the fisheye lens as an imaging range and to obtain high resolution in the high-resolution region 10a.

In the first embodiment, a projection property that is approximated to those of the center projection scheme (y=f×tan θ) and the equidistance projection scheme (y=f×θ), which are projection properties of the optical systems for ordinary image capturing in the high-resolution region (low-distortion region), is used.

Therefore, it is possible to achieve high-definition display with less optical distortion. It is thus possible to obtain a natural sense of perspective when a vehicle, or the like, behind is visually recognized and to obtain satisfactory visibility with reduced degradation of image quality.

Note that, since similar effects can be obtained as long as the projection property y(θ) satisfies the condition of Expression 1 described above, the first embodiment is not limited to the projection property illustrated in FIG. 2. Note that, in the first embodiment, the optical system 10 having the projection property y(θ) satisfying the condition of Expression 1 described above may be referred to as a different-angle-of-view lens.

Returning to FIG. 1, the image processing unit 30 develops the imaged signal generated by the imaging unit 20, performs processing such as wide dynamic range (WDR) correction, gamma correction, look up table (LUT) processing, and distortion correction, and thus generates image data.

For example, the image processing unit 30 executes an image processing step of generating the image data from the imaged signal obtained in the imaging step. Through the processing, it is possible to obtain an image that can be easily visually recognized when it is displayed on the rear monitor 60 and the electronic rear-view mirror 70.

Note that, while the optical system 10 has a small amount of distortion and can perform image recognition without distortion correction in the high-resolution region, it is possible to improve a recognition rate of the vehicle-behind-on-lateral-side recognition unit 80 through distortion correction in the low-resolution region. The image processed by the image processing unit 30 is supplied to the rear monitor 60, the image cutting processing unit 40, and the vehicle-behind-on-lateral-side recognition unit 80.

The image cutting processing unit 40 performs cutting of a part of the image processed by the image processing unit 30. The cutting of the image is performed by storing data of the image processed by the image processing unit 30 in a memory such as a RAM and reading only data of the image to be cut.

In the first embodiment, the position to be cut includes a second region R2 corresponding to an angle of view for imaging the side behind the vehicle itself at a wide angle at the time of backward traveling, the image of which has been formed by the optical system 10. Also, the position includes a first region R1 corresponding to the angle of view of high resolution for observing the vehicle 300 on the side behind the vehicle itself at the time of ordinary traveling.

In the first embodiment, the first region R1 is a region to be cut from the inside of the high-resolution region 10a. Therefore, since the image of the first region R1 can be displayed without distortion correction, it is possible to be displayed and recognized with a small amount of delay at the time of high-speed traveling or the like, and it is thus advantageously used for avoiding a risk at the time of emergency and the like.

Figure 3A:
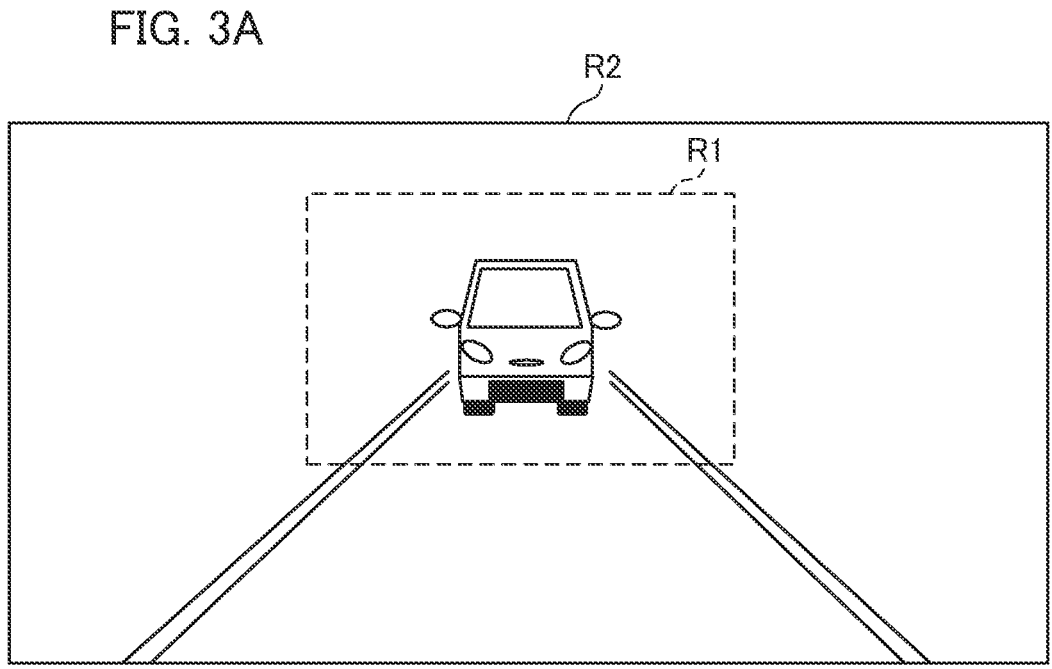
FIG. 3A is an image diagram illustrating a first region R1 and a second region R2.

FIG. 3A is an image diagram illustrating the first region R1 and the second region R2. The region to be displayed on the electronic rear-view mirror 70 is the first region R1, and the region to be displayed on the rear monitor 60 is the second region R2.

Figure 3B:
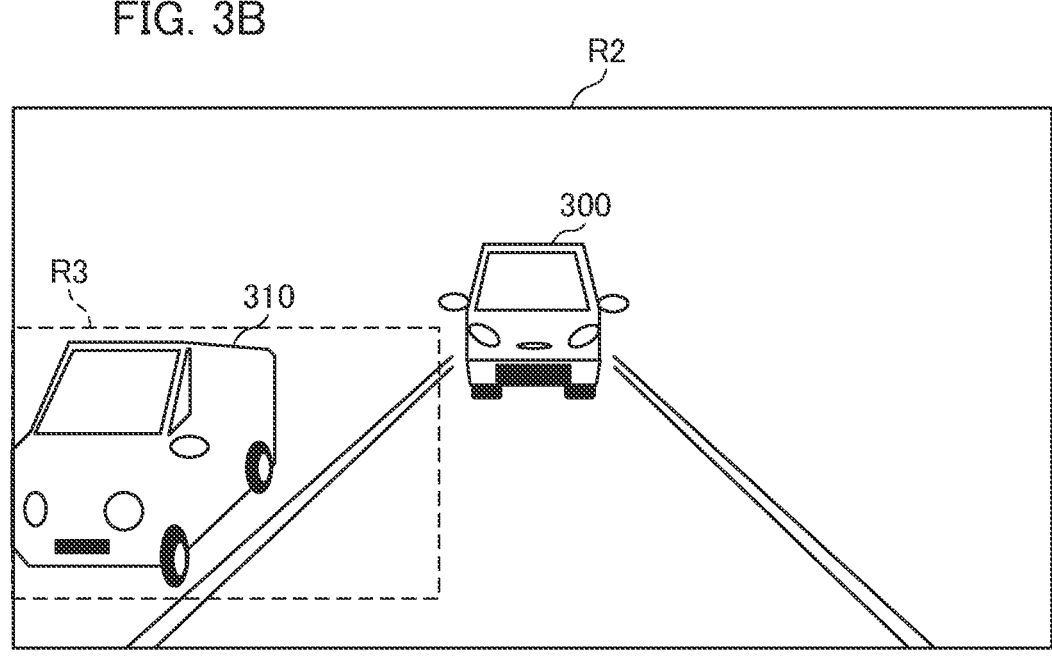
FIG. 3B is an image diagram illustrating a third region R3 and the second region R2.

The image cutting position changing unit 50 changes the cutting position of the image from the first region R1 in FIG. 3A to a third region R3 where the vehicle 310 behind on the lateral side can be displayed in a case when the vehicle-behind-on-lateral-side recognition unit 80 detects the vehicle 310 behind on the right side with respect to the traveling direction as in FIG. 3B. Then, image data of the third region R3 is displayed on the electronic rear-view mirror 70.

The change in cutting position of the image is performed by changing data to be read in the image data after the image processing performed by the image processing unit 30, which is stored in the memory such as the RAM. Here, the image cutting position changing unit 50 functions as a display control unit for controlling display on the rear monitor 60 and the electronic rear-view mirror 70.

In this manner, the image cutting position changing unit 50 causes the image data of the predetermined cut region (third region R3), including the high-distortion region including another moving apparatus behind on the lateral side to be displayed in a case when the another moving apparatus behind on the lateral side is detected in the first embodiment. FIG. 3B is an image diagram illustrating the third region R3 and the second region R2.

Although the third region R3 is assumed to be located on the right side behind the vehicle itself in FIG. 3B, the present invention is not limited to the right side behind. For example, the image cutting position changing unit 50 regards a region on the left side behind the vehicle itself as the third region R3 in a case when the vehicle-behind-on-lateral-side recognition unit 80 detects a vehicle behind on the left side. For example, the third region R3 is a region including the high-distortion region including the other moving apparatus behind on the lateral side.

The image cutting position changing unit 50 may cause the image of the first region R1 and the image of the third region R3 to be displayed on the electronic rear-view mirror 70 at the same time by a method such as PbyP or PinP. The image cutting position changing unit 50 may notify the user of the fact that switching to the image of the third region R3 has been performed using sound, switching animation, or the like, when the image of the first region R1 is switched to the image of the third region R3.

The rear monitor 60 is a display unit such as a liquid crystal display, is disposed in a center console, for example, of the vehicle itself, and is used to display a navigation screen, or the like, at the time of ordinary traveling. Also, the rear monitor 60 can also display the image of the second region R2 after processing, such as distortion correction performed by the image processing unit 30 in response to a selection operation performed by the user.

The electronic rear-view mirror 70 is a display unit such as a liquid crystal display and is disposed above a wind shield, for example, of the vehicle itself. Also, the electronic rear-view mirror 70 displays either the image of the first region R1 and the image of the third region R3 cut by the image cutting processing unit 40 or both the images at the same time.

The vehicle-behind-on-lateral-side recognition unit 80 detects that the vehicle 310 on the lateral side behind the vehicle itself is present in the second region R2 of the image processed by the image processing unit 30 through image recognition using a learned model for recognizing a vehicle behind on the lateral side obtained by learning learning data including the image of the vehicle behind on the lateral side.

Note that detection is not performed with regard to the first region R1 at that time. Here, the vehicle-behind-on-lateral-side recognition unit 80 functions as a detection unit that detects another moving apparatus on the lateral side behind the moving apparatus through image recognition based on image data including a high-distortion region.

Then, in a case when the vehicle 310 on the lateral side behind the vehicle itself is detected, the vehicle-behind-on-lateral-side recognition unit 80 notifies the image cutting position changing unit 50 of the fact. In a case when vehicles 310 are detected on both the right side and the left side behind the vehicle itself, the image cutting position changing unit 50 is notified of the fact that there is a vehicle on the lateral side behind the vehicle itself corresponding to the later detection, for example.

Also, if the vehicle-behind-on-lateral-side recognition unit 80 frequently notifies the image cutting position changing unit 50 of whether or not there is a vehicle 310 on the lateral side behind the vehicle itself, and the cutting position is changed every time, the cutting position of the image is frequently changed, which may be complicated. Therefore, the image cutting position changing unit 50 may not change the cutting position until a specific period of time elapses after detection of presence of the vehicle 310 on the lateral side behind the vehicle itself and notification to the image cutting position changing unit 50.

Next, control for changing a cutting position of an image when the vehicle 310 on the lateral side behind the vehicle itself is detected from an image acquired by the vehicle-behind-on-lateral-side recognition unit 80 will be described in order.

The image processing unit 30 performs image processing on an image acquired by the imaging unit 20 and transmits the image to the vehicle-behind-on-lateral-side recognition unit 80.

The vehicle-behind-on-lateral-side recognition unit 80 monitors whether or not there is a vehicle in a region other than the first region R1 in the second region R2 in the input image. In a case when the vehicle-behind-on-lateral-side recognition unit 80 detects that there is a vehicle in a region other than the first region R1 in the second region R2, the vehicle-behind-on-lateral-side recognition unit 80 notifies the image cutting position changing unit 50 of the fact that it has detected the vehicle.

The image cutting position changing unit 50 changes cutting position of the image cut by the image cutting processing unit 40 from the first region R1 to the position where the vehicle 310 behind on the lateral side can be displayed (the third region R3 in a case of a vehicle behind on a right side).

Figure 4:
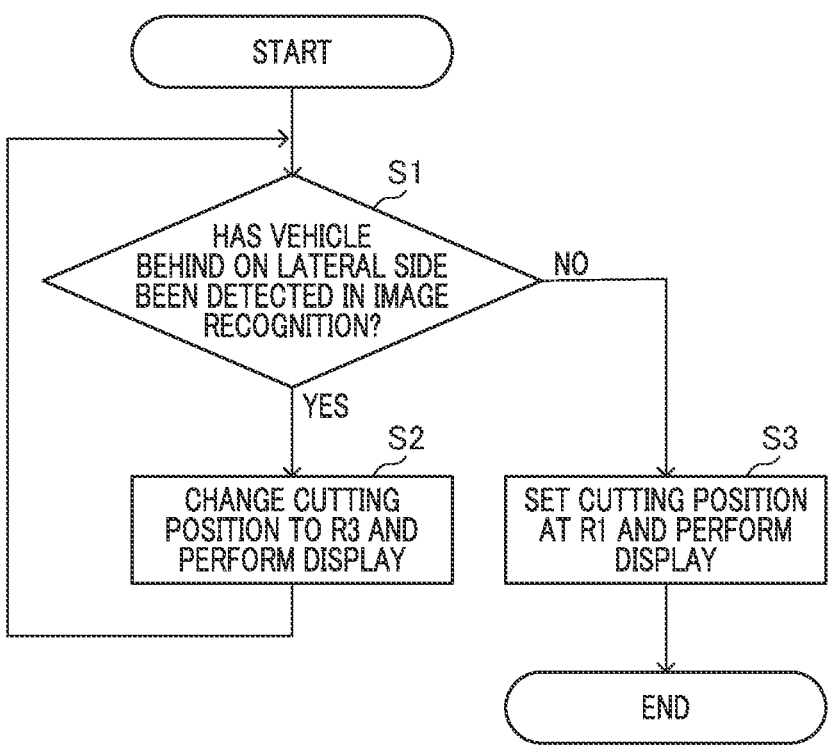
FIG. 4 is a flowchart illustrating control of changing a position when an image is to be cutout when a vehicle 310 is detected on a lateral side behind the vehicle itself from an acquired image according to the first embodiment.

FIG. 4 illustrates a flowchart of control for the image cutting position changing unit 50 to change the cutting position of the image when the vehicle 310 on the lateral side behind the vehicle itself is detected from the acquired image. Note that the operation in each step illustrated in FIG.

4 is controlled by a computer included in the image processing apparatus 200 executing a computer program stored in a storage medium.

In Step S1, the vehicle-behind-on-lateral-side recognition unit 80 determines whether or not there is a vehicle 310 within a predetermined distance on the lateral side behind the vehicle itself. Here, Step S1 functions as a detection step for detecting another moving apparatus behind on the lateral side.

In a case when the vehicle-behind-on-lateral-side recognition unit 80 determines that there is a vehicle 310 within the predetermined distance on the lateral side behind the vehicle itself in Step S1, the processing proceeds to Step S2.

Then, in Step S2, the image cutting position changing unit 50 changes the image cutting position from the first region R1 to a position where the vehicle 310 as another moving apparatus behind on the lateral side can be displayed (the third region R3 in a case of a vehicle behind on the right side) and displays the image on the electronic rear-view mirror 70. Note that the third region R3 is a region including the high-distortion region including the other moving apparatus behind on the lateral side.

In a case when the vehicle-behind-on-lateral-side recognition unit 80 determines that there is no vehicle 310 within the predetermined distance on the lateral side behind the vehicle itself in Step S1, the processing proceeds to Step S3. Then, in Step S3, the image cutting position changing unit 50 determines the first region R1 as the cutting position and causes the electronic rear-view mirror 70 to display the image of the first region R1. Here, Steps S1 to S3 function as a display control step.

Note that it is assumed that the image cutting position changing unit 50 has changed the image cutting position to the position where the vehicle 310 behind on the lateral side can be displayed (the third region R3 in the case of the vehicle behind on the right side) in Step S2 and the vehicle 310 has then moved from the lateral side behind the vehicle itself. In such a case, the vehicle-behind-on-lateral-side recognition unit 80 determines that there is no vehicle 310 within the predetermined distance on the lateral side behind the vehicle itself in Step S1.

Then, since there is no need to continue the changing to the position where the vehicle 310 behind on the lateral side can be displayed, the image cutting position changing unit 50 returns the image cutting position to the first region R1 in Step S3. Note that the changing speed for returning the image cutting position from the third region to the first region R1 may be lower than the changing speed when the image cutting position is changed from the first region R1 to the third region.

In the first embodiment, the control for changing the image cutting position when the vehicle 310 within the predetermined distance on the lateral side behind the vehicle itself is detected from the acquired image has been described. It is thus possible to check the vehicle at the part corresponding to the blind angle where it is difficult to recognize the vehicle with a side mirror, such as a lateral side behind the vehicle itself, without using an imaging device or a detection unit other than the imaging device for imaging the side behind the vehicle itself.

Second Embodiment in the First Embodiment, the Vehicle 310 on the Lateral Side behind the vehicle itself is detected through image recognition of an image captured by the imaging device mounted on the rear side of the vehicle. In a second embodiment, a method of detecting the vehicle 310 on the lateral side behind the vehicle itself with another sensor instead of the imaging device will be described.

Figure 5:
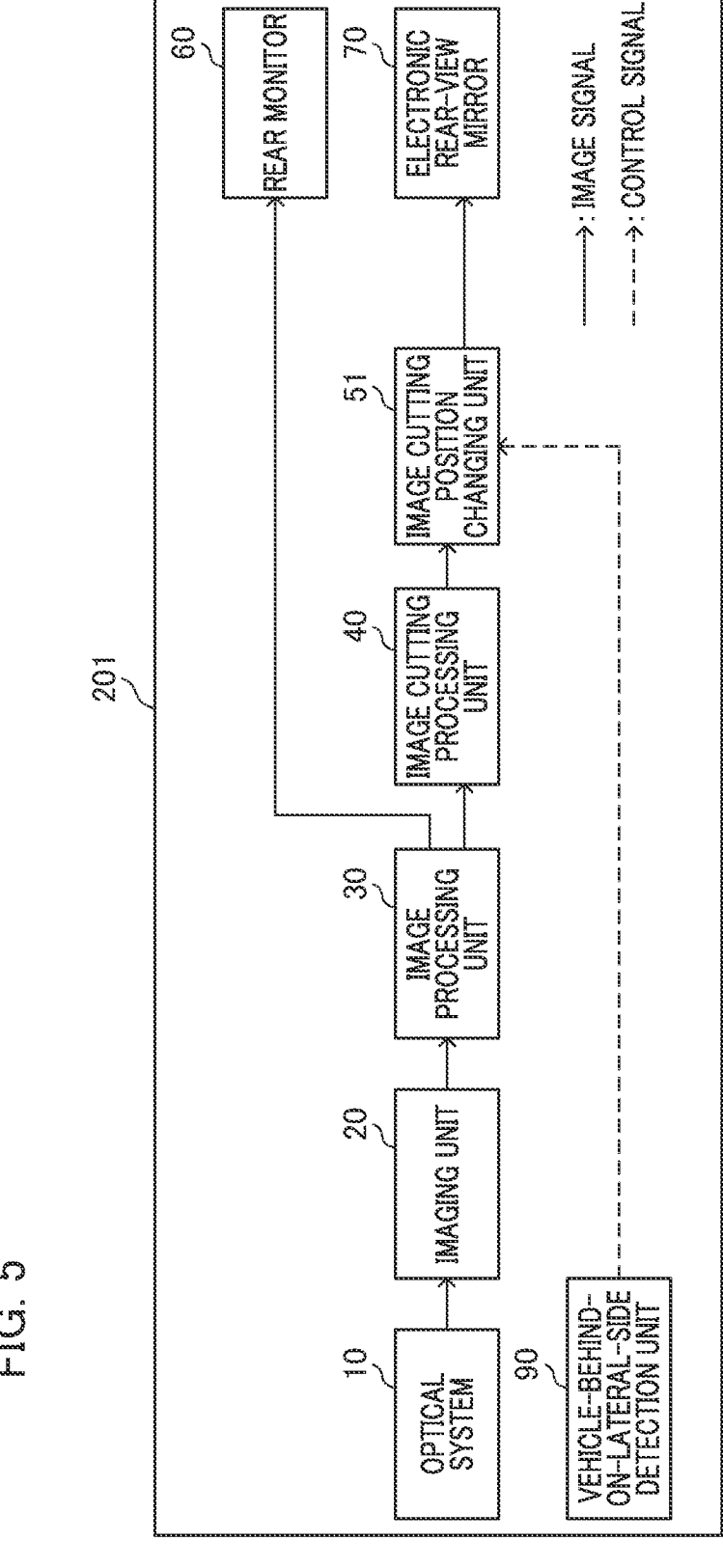
FIG. 5 is a block diagram for explaining a configuration example of an image processing apparatus according to a second embodiment.

FIG. 5 is a block diagram for explaining a configuration example of an image processing apparatus 201 according to the second embodiment. The image processing apparatus 201 according to the second embodiment includes an optical system 10, an imaging unit 20, an image processing unit 31, an image cutting processing unit 40, an image cutting position changing unit 51, a rear monitor 60, an electronic rear-view mirror 70, and a vehicle-behind-on-lateral-side detection unit 90.

The vehicle-behind-on-lateral-side detection unit 90 is a detection unit such as an infrared sensor or a radar disposed on the rear side of the vehicle itself and detects a vehicle 310 within a predetermined distance on a right side or a left side behind the vehicle itself. The vehicle-behind-on-lateral-side detection unit 90 notifies the image cutting position changing unit 51 of the fact that it has detected that there is a vehicle within the predetermined distance on the right side or the left side behind the vehicle itself.

In a case when the vehicle-behind-on-lateral-side detection unit 90 detects the vehicle 310 behind on the right side or the left side within the predetermined distance, the image cutting position changing unit 51 changes the image cutting position from the first region R1 to a predetermined cutting position where the vehicle behind on the right side or the left side can be displayed. Then, the image is displayed on the electronic rear-view mirror 70.

Note that, since configurations other than the vehicle-behind-on-lateral-side detection unit 90 and the image cutting position changing unit 51 are the same as those in the first embodiment, a description thereof will be omitted.

As described above, according to the second embodiment, it is possible to detect the vehicle 310 within the predetermined distance on the lateral side behind the vehicle itself with a detection unit, such as an infrared sensor or a radar disposed on the side behind the vehicle itself and to check the vehicle at the part corresponding to the blind angle on the lateral side behind the vehicle itself in the image.

Third Embodiment

In the first and second embodiments, the control for changing the image cutting position when the vehicle 310 is detected within the predetermined distance on the lateral side behind the vehicle itself has been described. There may be a case when it is easier to check a vehicle at a part corresponding to a blind angle where it is difficult to recognize the vehicle with a side mirror, such as a lateral side behind the vehicle itself by changing the size of the cut image depending on the size of the vehicle 310 within the predetermined distance on the lateral side behind the vehicle itself.

In a case when the vehicle 310 within the predetermined distance on the lateral side behind the vehicle itself is a large truck, for example, the entire vehicle cannot be recognized depending on the size of the cut image, and an increase in size of the image to enable the entire vehicle to be recognized can thus further contribute to a safety check. Therefore, according to the third embodiment, the size of the cut image is changed in accordance with the size of the detected vehicle 310 within the predetermined distance on the lateral side behind the vehicle itself.

Figure 6:
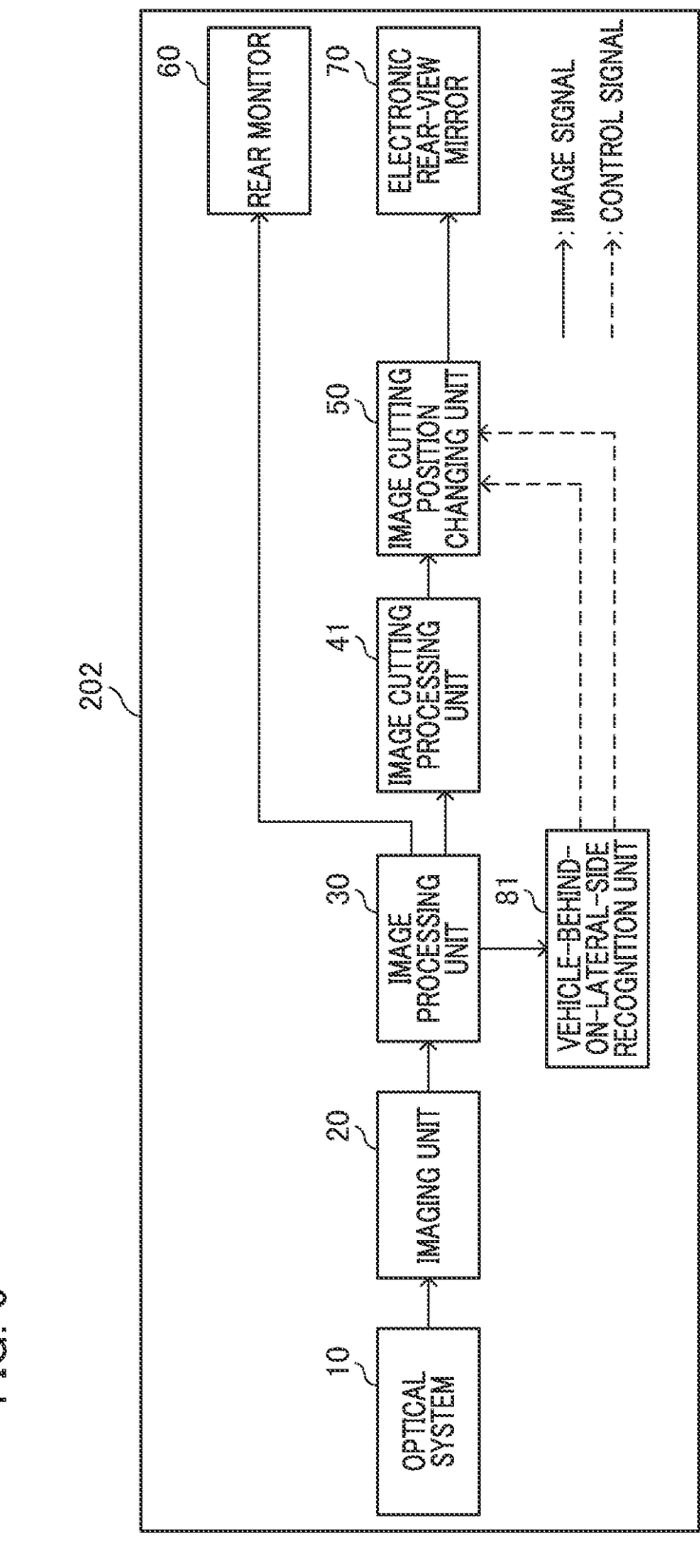
FIG. 6 is a block diagram for explaining a configuration example of an image processing apparatus according to a third embodiment.

FIG. 6 is a block diagram for explaining a configuration example of an image processing apparatus 202 according to a third embodiment. The image processing apparatus 202 includes an optical system 10, an imaging unit 20, an image processing unit 30, an image cutting processing unit 41, an image cutting position changing unit 50, a rear monitor 60, an electronic rear-view mirror 70, and a vehicle-behind-on-lateral-side recognition unit 81.

The vehicle-behind-on-lateral-side recognition unit 81 detects that there is a vehicle 310 within a predetermined distance on the lateral side behind the vehicle itself through image recognition on an image processed by the image processing unit 30 using a learned model for recognizing a vehicle behind on the lateral side obtained by learning learning data including an image of the vehicle behind on the lateral side. Then, the vehicle-behind-on-lateral-side recognition unit 81 notifies the image cutting position changing unit 50 of the image recognition result.

Moreover, it is possible to detect the size of the vehicle 310 within the predetermined distance on the lateral side behind the vehicle itself using the learned model for recognizing the size of the vehicle behind on the lateral side within the predetermined distance, which has been obtained by learning the learning data including the image of the vehicle behind on the lateral side that may have various sizes within the predetermined distance. Then, the vehicle-behind-on-lateral-side recognition unit 81 notifies the image cutting processing unit 41 of size information of the vehicle 310 within the predetermined distance on the lateral side behind the vehicle itself.

As the size of the vehicle 310 within the predetermined distance on the lateral side behind the vehicle itself detected by the vehicle-behind-on-lateral-side recognition unit 81, information as an arbitrary size with which the vehicle 310 on the lateral side behind the vehicle itself can be imaged may be provided as a notification, or information may be provided as a notification by categorizing the size into a plurality of levels such as large, middle, and small. Note that, in a case when vehicles 310 are detected within the predetermined distance on both the right side and the left side behind the vehicle itself, a notification that there is a vehicle within the predetermined distance on the lateral side behind the vehicle itself corresponding to the later detection is provided to the image cutting position changing unit 50.

The image cutting processing unit 41 performs cutting of a part of the image processed by the image processing unit 30. The cutting of the image is performed by storing data of the image after image processing performed by the image processing unit 30 in a memory such as a RAM and reading only data of the image to be cut.

The position to be cut is a first region R1 corresponding to a narrow angle of view of high resolution for observing the vehicle 300 on the side behind the vehicle itself at the time of ordinary traveling in a second region corresponding to an angle of view for imaging the side behind the vehicle itself at a wide angle at the time of backward traveling, the image of which has been formed by the optical system 10. Also, the size of a third region R3 to be cut is changed in accordance with the information on the size of the vehicle 310 within the predetermined distance on the lateral side behind the vehicle itself provided as a notification from the vehicle-behind-on-lateral-side recognition unit 81.

Note that, since configurations other than the vehicle-behind-on-lateral-side recognition unit 81 and the image cutting processing unit 41 are the same as those in the first embodiment, a description thereof will be omitted.

Since the size of the image to be cut is changed in accordance with the size of the vehicle 310 within the predetermined distance on the lateral side behind the vehicle itself in the third embodiment, it is possible to check the entire vehicle regardless of the size of the vehicle 310 within the predetermined distance on the lateral side behind the vehicle itself.

Since the image data capacity increases by increasing the size of the image to be cut by the image cutting processing unit 41, the image data capacity may be reduced by lowering a frame rate of the image or downscaling the image.

Note that, in a case when it is not desired to lower the frame rate of the image or to downscale the image, control for changing the size of the image to be cut may be able to be selectively turned off in accordance with the size of the vehicle 310 on the lateral side behind the vehicle itself.

Fourth Embodiment

In a fourth embodiment, a method of checking a part corresponding to a blind angle, such as a lateral side behind the vehicle itself, which is difficult to be checked with a side mirror, in an image when the vehicle itself is about to turn right or left, or to change lanes will be described.

Figure 7:
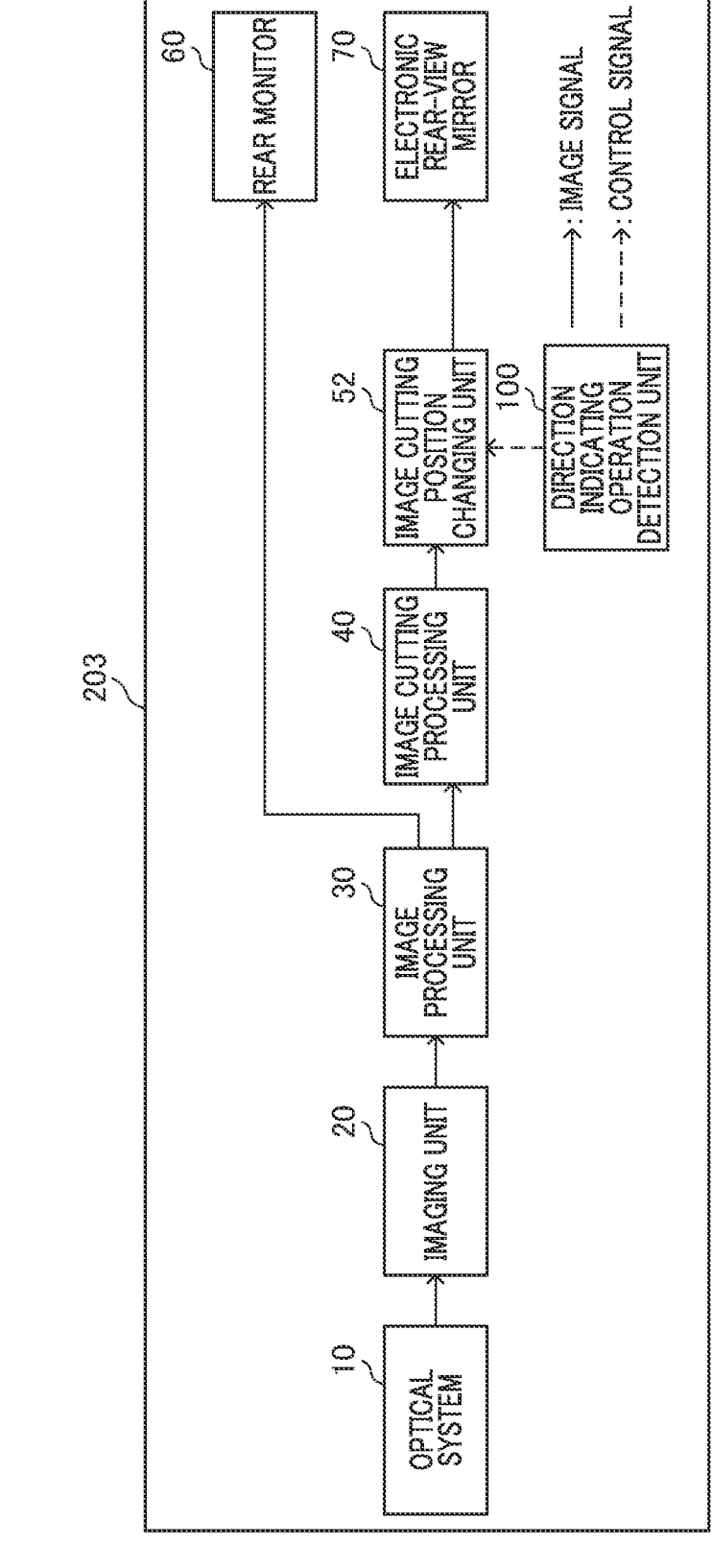
FIG. 7 is a block diagram for explaining a configuration example of an image processing apparatus according to a fourth embodiment.

FIG. 7 is a block diagram for explaining a configuration example of an image processing apparatus 203 according to a fourth embodiment. The image processing apparatus 203 includes an optical system 10, an imaging unit 20, an image processing unit 30, an image cutting processing unit 40, an image cutting position changing unit 52, a rear monitor 60, an electronic rear-view mirror 70, and a direction indicating operation detection unit 100.

The direction indicating operation detection unit 100 detects an operation of turning on a direction indicator such as a turn (signal) switch or a turn (signal) lever, that is performed when the vehicle turns right or left or changes lanes with a temporary change in traveling direction and a direction of the direction indication and notifies the image cutting position changing unit 52 of the operation and the direction. Here, the direction indicating operation detection unit 100 functions as a direction detection unit that executes a direction detection step for detecting a change in traveling direction of the moving apparatus by detecting the operation direction of the direction indicator provided in the moving apparatus.

The image cutting position changing unit 52 changes the image cutting position cut by the image cutting processing unit 40 to a predetermined cutting position (fourth region R4) where the lateral side behind in the direction in which the direction indicator is turned on can be imaged and displays the predetermined cutting position on the electronic rear-view mirror 70.

For example, the image cutting position changing unit 50 causes image data of the predetermined cut region (fourth region R4) including a high-distortion region on the side of the changed traveling direction to be displayed in a case when a change in traveling direction of the moving apparatus is detected in the fourth embodiment.

In a case when the right or left direction indicator is turned on, for example, the cutting position is changed to the predetermined cutting position (fourth region R4) such that the part corresponding to a blind angle that is difficult to be checked with a side mirror on the right or left side behind the vehicle itself can be imaged.

At this time, the predetermined cutting position (fourth region R4) includes the high-distortion region on the side of the traveling direction. The change in the image cutting position is performed by changing data to be read in data of the image processed by the image processing unit 30 and stored in a memory such as a RAM.

Note that, since configurations other than the image cutting position changing unit 52 and the direction indicating operation detection unit 100 are the same as those in the first embodiment, a description thereof will be omitted.

FIG. 8 illustrates a flowchart of control for changing the image cutting position when an operation of the direction indicator is detected. Note that, each step illustrated in FIG. 8 is controlled by a computer included in the image processing apparatus 203 executing a computer program stored in a storage medium.

In Step S7, the direction indicating operation detection unit 100 determines whether or not the operation of turning on the direction indicator has been performed and a direction in which the direction indicator has been turned on. In a case when it is determined that the operation of turning on the direction indicator has been performed, the direction indicating operation detection unit 100 notifies the image cutting position changing unit 52 of the fact that the operation of turning on the direction indicator has been performed and of the direction in which the direction indicator has been turned on.

In a case when the direction indicating operation detection unit 100 determines that the operation of turning on the direction indicator has been performed in Step S7, the processing proceeds to Step S8. Then, in Step S8, the image cutting position changing unit 52 changes the cut image from the first region R1 to the predetermined cutting position (fourth region R4) where the lateral side behind the vehicle itself in the direction in which the direction indicator has been turned on can be imaged.

Then, the image cutting position changing unit 52 displays the image at the predetermined cutting position (fourth region R4) after the change on the electronic rear-view mirror 70.

In a case when the direction indicating operation detection unit 100 determines that the operation of turning on the direction indicator has not been performed in Step S7, the processing proceeds to Step S9. Then, in Step S9, the image cutting position changing unit 52 displays the cutting position of the image cut by the image cutting processing unit 40 as the first region R1 on the electronic rear-view mirror 70.

In a case when the vehicle itself completes turning right or left or changing of lanes after the direction indicating operation detection unit 100 detects the operation of the direction indicator and changes the image cutting position, there is no need to continue the changing of the image cutting position.

Therefore, the image cutting position changing unit 52 returns the image cutting position to the first region R1. The fact that the vehicle itself has completed turning right or left or changing of lanes is determined by not detecting the operation of the direction indicator.

In this manner, since the image cutting position is changed when the operation of the direction indicator is detected in the fourth embodiment, it is possible to reliably check, in the image, the part corresponding to the blind angle which is difficult to be checked with the side mirror, such as the right and left sides behind the vehicle itself when the vehicle itself is about to turn right or left or change lanes.

Fifth Embodiment

Examples in which a part corresponding to a blind angle that is difficult to be checked with a side mirror, such as a lateral side behind the vehicle itself, is checked with the imaging device on the side behind the vehicle itself have been described in the first to fourth embodiments. The imaging device on the side behind the vehicle itself is originally for checking the condition behind (right behind) the vehicle itself.

Therefore, in a case when there is a vehicle 300 on the side behind the vehicle itself, there may be a case when it is desired to continuously check a state behind the vehicle itself without changing the image cutting position even when there is the vehicle 310 on the lateral side behind the vehicle itself. In the fifth embodiment, an example in which whether or not to change the image cutting position is controlled in a case where there is a vehicle 300 on the side behind the vehicle itself in accordance with a user setting will be described.

Figure 9:
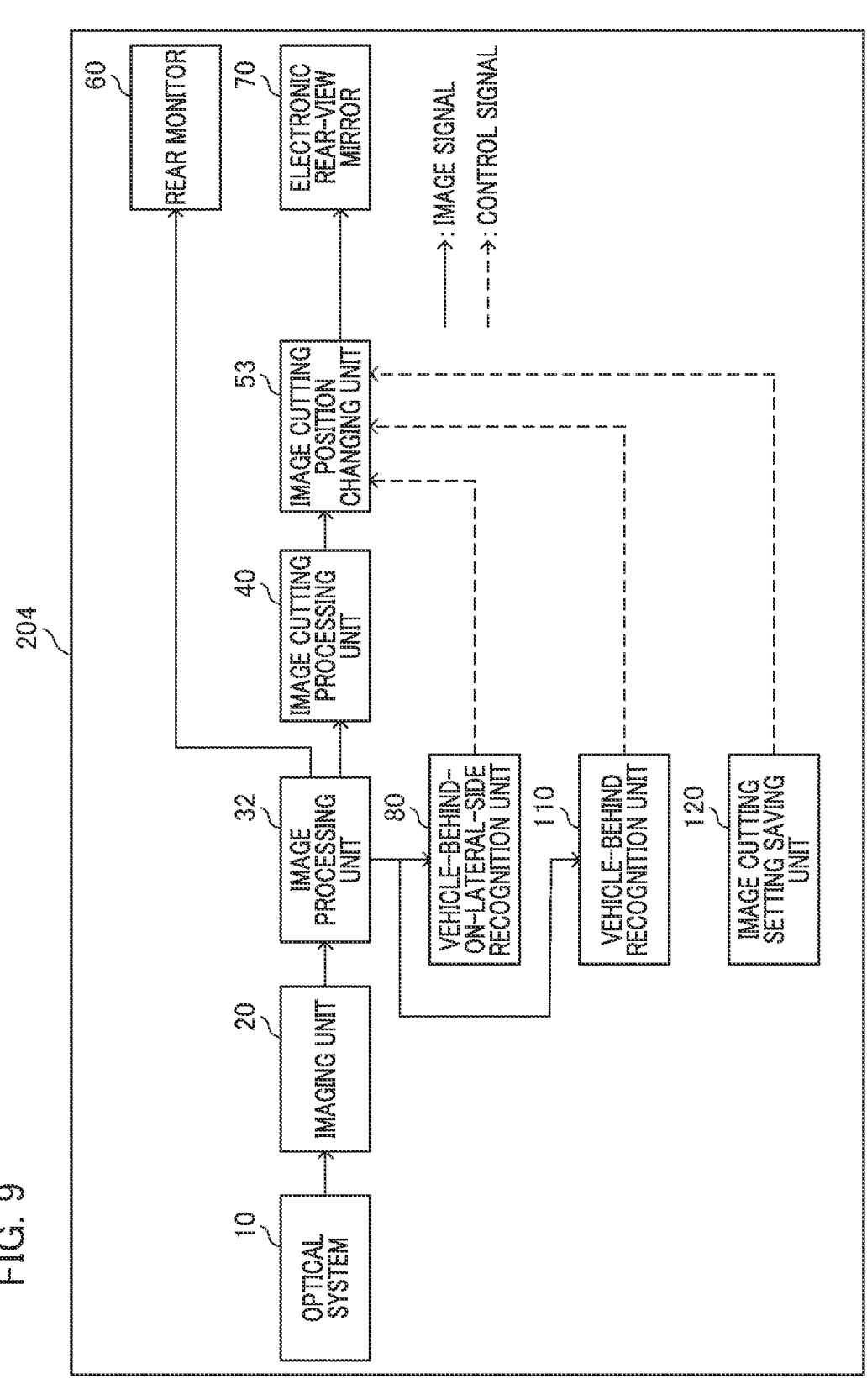
FIG. 9 is a block diagram for explaining a configuration example of an image processing apparatus according to a fifth embodiment.

FIG. 9 is a block diagram for explaining a configuration example of an image processing apparatus 204 according to the fifth embodiment. The image processing apparatus 204 includes an optical system 10, an imaging unit 20, an image processing unit 32, an image cutting processing unit 40, and an image cutting position changing unit 53. Furthermore, the image processing apparatus 204 includes a rear monitor 60, an electronic rear-view mirror 70, a vehicle-behind-on-lateral-side recognition unit 80, a vehicle-behind recognition unit 110, and an image cutting setting saving unit 120.

The image processing unit 32 performs processing such as wide dynamic range (WDR) correction, gamma correction, LUT processing, and distortion correction on digital data transmitted from the imaging unit 20. Through the processing, it becomes easier to visually recognize the digital data displayed on the rear monitor 60 and the electronic rear-view mirror 70, and a recognition rate of the vehicle-behind-on-lateral-side recognition unit 80 is improved.

The image processed by the image processing unit 32 is input to the rear monitor 60, the image cutting processing unit 40, the vehicle-behind-on-lateral-side recognition unit 80, and the vehicle-behind recognition unit 110.

The vehicle-behind recognition unit 110 detects, in the image after the image processing performed by the image processing unit 32, that there is a vehicle 300 on the side behind the vehicle itself using a learned model for recognizing a vehicle behind obtained by learning learning data including the image of the vehicle behind and notifies the image cutting position changing unit 53 of the fact.

The image cutting setting saving unit 120 saves setting regarding whether or not to cause the image cutting position changing unit 53 to change the image cutting position and notifies the image cutting position changing unit 53 of the setting content in a case when the vehicle-behind recognition unit 110 detects that there is a vehicle 300 on the side behind the vehicle itself. Here, the image cutting setting saving unit 120 functions as a setting unit for setting whether or not to cause image data in the predetermined cut region to be displayed.

Setting of causing the image cutting position changing unit 53 to change the image cutting position in a case when the vehicle-behind recognition unit 110 detects that there is a vehicle 300 on the side behind the vehicle itself will be defined as change setting below. Setting of not causing the image cutting position changing unit 53 to change the image cutting position in a case when the vehicle-behind recognition unit 110 detects the vehicle 300 on the side behind the vehicle itself will be defined as non-change setting below.

The image cutting position changing unit 53 receives a notification that the vehicle-behind-on-lateral-side recognition unit 80 has detected the vehicle 310 behind on the lateral side, a notification that the vehicle-behind recognition unit 110 has detected the vehicle 300 on the side behind the vehicle itself, and a notification of a setting saved in the image cutting setting saving unit 120. Then, the image cutting position changing unit 53 determines whether or not to change the image cutting position from the first region R1 to the position where the vehicle 310 behind on the lateral side can be displayed on the basis of the information in the notifications.

The image cutting position changing unit 53 displays either the image of the first region R1 or the image of the third region R3 after the changing of the cutting position or both the images on the electronic rear-view mirror 70 on the basis of the determination result. Details of the determination will be described in the flowchart in FIG. 10. The change in image cutting position is performed by changing data to be read in the image data after image processing performed by the image processing unit 32 stored in the memory, such as a RAM.

Note that, since configurations other than the image processing unit 32, the image cutting position changing unit 53, the vehicle-behind recognition unit 110, and the image cutting setting saving unit 120 are the same as those in the first embodiment, a description thereof will be omitted.

Next, control for determining whether or not to change the image cutting position in accordance with setting of the image cutting setting saving unit 120 will be described in order. The user saves the aforementioned change setting or non-change setting in the image cutting setting saving unit 120.

In a case when the change setting is saved in the image cutting setting saving unit 120, the image cutting position changing unit 53 changes the image cutting position once the vehicle-behind-on-lateral-side recognition unit 80 detects the vehicle 310 within the predetermined distance on the lateral side behind the vehicle itself regardless of whether the vehicle 300 on the side behind the vehicle itself, has been detected.

In a case when the non-change setting is saved in the image cutting setting saving unit 120, and, in a case when the vehicle 300 on the side behind the vehicle itself has been detected, the image cutting position changing unit 53 does not change the image cutting position even if the vehicle-behind-on-lateral-side recognition unit 80 detects the vehicle 310 within the predetermined distance on the lateral side behind the vehicle itself.

Figure 10:
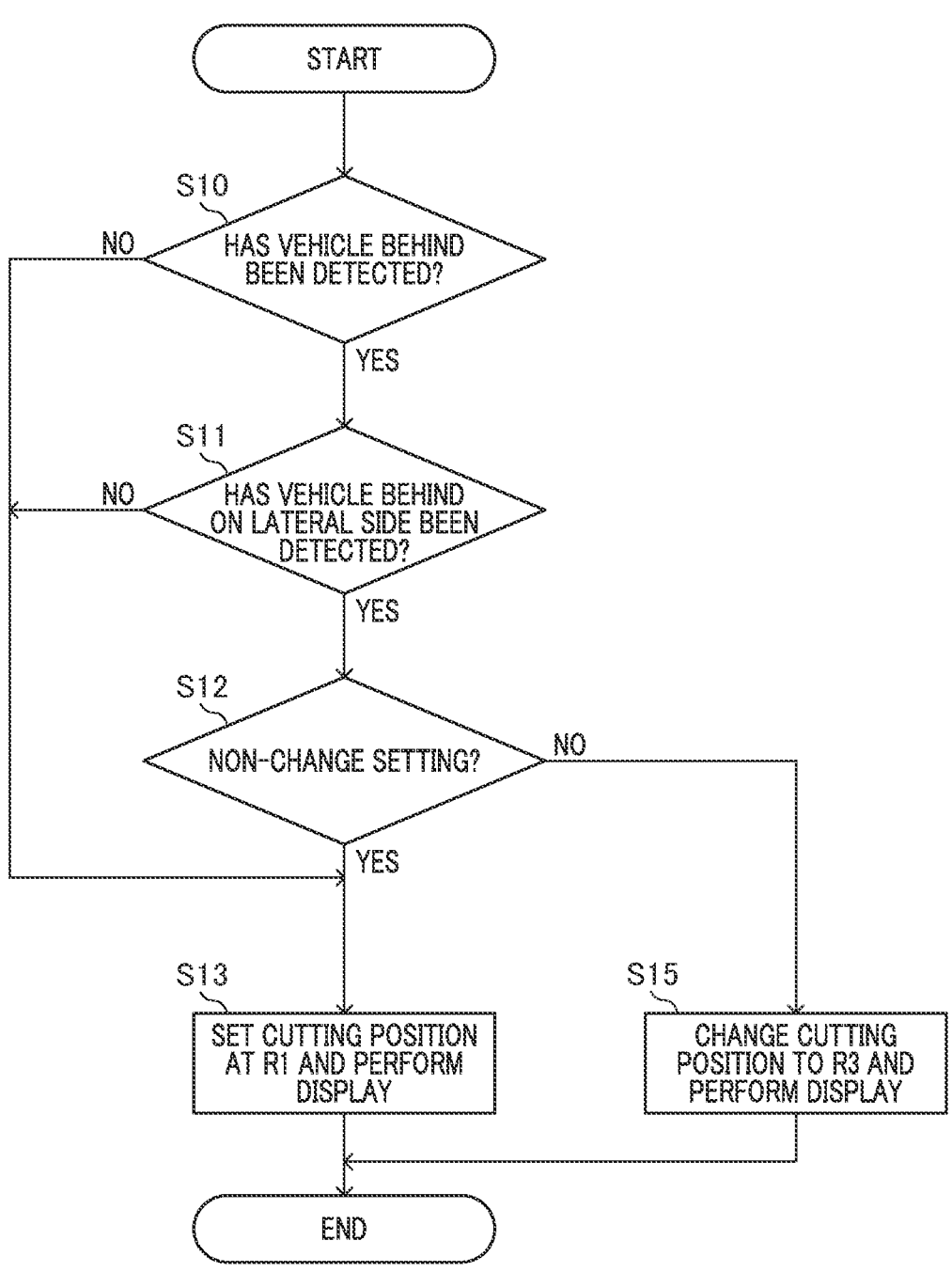
FIG. 10 is a flowchart for controlling whether or not to change a position to be cut in an image in accordance with setting of an image cutting setting saving unit 120 according to the fifth embodiment.

FIG. 10 illustrates a flowchart for controlling whether or not to change the image cutting position in accordance with setting of the image cutting setting saving unit 120. Note that, each step illustrated in FIG. 10 is controlled by a computer included in the image processing apparatus 204 executing a computer program stored in a storage medium.

In Step S10, the vehicle-behind recognition unit 110 determines that there is a vehicle 300 on the side behind the vehicle itself.

In a case when the vehicle-behind recognition unit 110 determines that there is a vehicle 300 on the side behind the vehicle itself in Step S10, the vehicle-behind-on-lateral-side recognition unit 80 determines that there is a vehicle 310 within the predetermined distance on the lateral side behind the vehicle itself, in Step S11.

In a case when the vehicle-behind-on-lateral-side recognition unit 80 determines that there is no vehicle 310 within the predetermined distance on the lateral side behind the vehicle itself in Step S11, the image cutting position changing unit 50 does not change the image cutting position.

In a case when the vehicle-behind recognition unit 110 determines that there is no vehicle 300 on the side behind the vehicle itself in Step S10, the processing in Step S13 is performed.

In a case when the vehicle-behind-on-lateral-side recognition unit 80 determines that there is a vehicle 310 within the predetermined distance on the lateral side behind the vehicle itself in Step S11, whether or not the non-change setting is saved in the image cutting setting saving unit 120 is determined in Step S12.

In a case when the change setting is saved, the image cutting position changing unit 50 changes the cutting position in Step S15. In a case when the non-change setting is saved in the image cutting setting saving unit 120 in Step S12, the image cutting position changing unit 50 does not change the cutting position in Step S13.

Since whether or not to change the image cutting position is determined in accordance with the setting of the image cutting setting saving unit 120 in the fifth embodiment, it is possible to prevent the image cutting position from being changed despite the intension of the user.

Note that the unit for detecting the vehicle on the lateral side behind the vehicle itself is the vehicle-behind-on-lateral-side recognition unit 80 in the fifth embodiment, another sensor may perform the detection as in the second embodiment.

Although the example in which the cutting position change setting and non-change setting can be selected in a case when the vehicle 310 is detected on the lateral side behind the vehicle itself has been described in the fifth embodiment, the cutting position change setting and non-change setting may be able to be selected in a case when an operation of turning on the direction indicator is performed. For example, the image cutting setting saving unit 120 can selectively set whether or not to cause image data of a predetermined cut region (third region R3 or the fourth region R4) to be displayed.

Seventh Embodiment

The moving apparatus (vehicle itself or another vehicle) according to the aforementioned embodiments is not limited to an automobile and may be any movable apparatus such as a motorcycle, a bicycle, a wheelchair, a ship, an airplane, a robot, or a drone.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In addition, as a part or the whole of the control according to the embodiments, a computer program realizing the function of the embodiments described above may be supplied to the image processing apparatus through a network or various storage media. Then, a computer (or a CPU, an MPU, or the like) of the image processing apparatus may be configured to read and to execute the program. In such a case, the program and the storage medium storing the program configure the present invention.

What is claimed is:

1. An image processing apparatus comprising:
an imaging device including an optical system for forming an optical image, including a low-distortion region and a high-distortion region, on a light receiving surface and configured to generate an image signal of a side behind a moving apparatus; and
at least one processor or circuit configured to function as:
an image processing unit configured to generate image data from the image signal generated by the imaging device;

a detection unit configured to detect another moving apparatus within a predetermined distance on a lateral side behind the moving apparatus; and
a display control unit configured to cause the image data in a predetermined cut region, including the high-distortion region including the moving apparatus behind on the lateral side, to be displayed as an enlarged image by a display device, in a case when the other moving apparatus behind on the lateral side is detected by the detection unit,
wherein the detection unit detects a size of the other moving apparatus behind on the lateral side detected by the detection unit, and the display control unit changes a size of the predetermined cut region to be displayed as the enlarged image by the display device, in accordance with the size of the other moving apparatus behind on the lateral side, and
wherein, in a case when a focal distance of the optical system is defined as f, a half angle of view is defined as θ, an image height on an image plane is defined as y, and a projection property representing a relationship between the image height y and the half angle of view θ is defined as y(θ),
y(θ) in the low-distortion region is greater than f×θ and is different from the projection property in the high-distortion region.

2. The image processing apparatus according to claim 1, wherein, in a case when the detection unit does not detect the other moving apparatus behind on the lateral side, the image data in a first region corresponding to the low-distortion region in the image data is caused to be displayed.

3. The image processing apparatus according to claim 1, wherein the low-distortion region is configured to have a projection property that is approximated to a center projection method (y=f×tan θ) or an equidistant projection method (y=f×θ).

4. The image processing apparatus according to claim 1, wherein, in a case when θ max is defined as a maximum half angle of view that the optical system has, the image processing apparatus is configured to satisfy:

$$1 < f \times \sin(\theta\ max)/y(\theta\ max) \leq 1.9.$$

5. The image processing apparatus according to claim 1, wherein the detection unit detects a size of the other moving apparatus behind on the lateral side by using the learned model for recognizing the size of a vehicle.

6. The image processing apparatus according to claim 1, wherein the detection unit detects the other moving apparatus behind on the lateral side through image recognition based on the image data including the high-distortion region.

7. The image processing apparatus according to claim 1, wherein the detection unit includes an infrared sensor or radar.

8. The image processing apparatus according to claim 1, wherein the at least one processor or circuit is further configured to function as:
a setting unit configured to set whether or not to cause the display control unit to display the image data in the predetermined cut region.

9. The image processing apparatus according to claim 1, wherein the at least one processor or circuit is further configured to function as:
a direction detection unit configured to detect a change in a traveling direction of the moving apparatus,
wherein the display control unit causes the image data in a predetermined cut region, including the high-distortion region on a side of the changed traveling direction to be displayed in a case when the direction detection unit detects a change in the traveling direction of the moving apparatus.

10. An image processing apparatus comprising:

an imaging device including an optical system for forming an optical image, including a low-distortion region and a high-distortion region, on a light receiving surface and configured to generate an image signal of a side behind a moving apparatus; and at least one processor or circuit configured to function as:

an image processing unit configured to generate image data from the image signal generated by the imaging device;

a direction detection unit configured to detect a change in a traveling direction of the moving apparatus;

a detection unit configured to detect another moving apparatus within a predetermined distance on a lateral side behind the moving apparatus; and a display control unit configured to cause the image data in a predetermined cut region, including the high-distortion region on a side of the changed traveling direction, to be displayed as an enlarged image by a display device, in a case when a change in the traveling direction of the moving apparatus is detected by the direction detection unit, wherein the display control unit is configured to cause the image data in a predetermined cut region, including the high-distortion region including the moving apparatus behind on the lateral side, to be displayed in a case when the other moving apparatus behind on the lateral side is detected by the detection unit, wherein the detection unit detects a size of the other moving apparatus behind on the lateral side detected by the detection unit, and the display control unit changes a size of the predetermined cut region to be displayed as the enlarged image by the display device, in accordance with the size of the other moving apparatus behind on the lateral side, and wherein, in a case when a focal distance of the optical system is defined as f, a half angle of view is defined as $\theta$, an image height on an image plane is defined as y, and a projection property representing a relationship between the image height y and the half angle of view $\theta$ is defined as $y(\theta)$, $y(\theta)$ in the low-distortion region is greater than $f \times \theta$ and is different from the projection property in the high-distortion region.

11. The image processing apparatus according to claim 10, wherein, in a case when the direction detection unit does not detect a change in the traveling direction of the moving apparatus, the image data in a first region corresponding to the low-distortion region in the image data is caused to be displayed.

12. The image processing apparatus according to claim 10, wherein the low-distortion region is configured to have a projection property that is approximated to a center projection method ($y=f \times \tan \theta$) or an equidistant projection method ($y=f \times \theta$).

13. The image processing apparatus according to claim 10, wherein, in a case when $\theta$ max is defined as a maximum half angle of view that the optical system has, the image processing apparatus is configured to satisfy:

$$1 < f \times \sin(\theta \text{ max})/y(\theta \text{ max}) \leq 1.9.$$

14. The image processing apparatus according to claim 10, wherein the direction detection unit detects an operation direction of a direction indicator provided in the moving apparatus.

15. The image processing apparatus according to claim 10, wherein the at least one processor or circuit is further configured to function as:

a setting unit configured to set whether or not to cause the display control unit to display the image data in the predetermined cut region.

16. An image processing method comprising:

generating an image signal of a side behind a moving apparatus using an imaging device including an optical system configured to form an optical image, including a low-distortion region and a high-distortion region, on a light receiving surface;

generating image data from the image signal of the side behind the moving apparatus;

detecting another moving apparatus within a predetermined distance on a lateral side behind the moving apparatus; and causing the image data in a predetermined cut region, including the high-distortion region including the other moving apparatus behind on the lateral side, to be displayed as an enlarged image by a display device, in a case when the other moving apparatus behind on the lateral side is detected in the detecting of the moving apparatus, wherein the detecting detects a size of the other moving apparatus behind on the lateral side, and a size of the predetermined cut region to be displayed as the enlarged image by the display device is changed in accordance with the size of the other moving apparatus behind on the lateral side, and wherein, in a case when a focal distance of the optical system is defined as f, a half angle of view is defined as $\theta$, an image height on an image plane is defined as y, and a projection property representing a relationship between the image height y and the half angle of view $\theta$ is defined as $y(\theta)$, $y(\theta)$ in the low-distortion region is greater than $f \times \theta$ and is different from the projection property in the high-distortion region.

17. An image processing method comprising:

generating an image signal of a side behind a moving apparatus using an imaging device including an optical system configured to form an optical image, including a low-distortion region and a high-distortion region, on a light receiving surface;

generating image data from the image signal of the side behind the moving apparatus;

detecting a change in a traveling direction of the moving apparatus;

detecting another moving apparatus within a predetermined distance on a lateral side behind the moving apparatus;

causing the image data in a predetermined cut region, including the high-distortion region on a side of the changed traveling direction, to be displayed as an enlarged image by a display device, in a case when a change in the traveling direction of the moving apparatus is detected in the detecting of the change in traveling direction; and causing the image data in a predetermined cut region, including the high-distortion region including the other moving apparatus behind on the lateral side, to be displayed in a case when the other moving apparatus behind on the lateral side is detected in the detecting of the moving apparatus, wherein the detecting detects a size of the other moving apparatus behind on the lateral side, and a size of the predetermined cut region to be displayed as the enlarged image by the display device is changed in accordance with the size of the other moving apparatus behind on the lateral side detected, and wherein, in a case when a focal distance of the optical system is defined as f, a half angle of view is defined as $\theta$, an image height on an image plane is defined as y, and a projection property representing a relationship between the image height y and the half angle of view $\theta$ is defined as $y(\theta)$, $y(\theta)$ in the low-distortion region is greater than $f \times \theta$ and is different from the projection property in the high-distortion region.

18. A non-transitory computer-readable storage medium configured to store a computer program comprising instructions for executing the following processes:

generating an image signal of a side behind a moving apparatus using an imaging device including an optical system configured to form an optical image, including a low-distortion region and a high-distortion region, on a light receiving surface;

generating image data from the image signal of the side behind the moving apparatus;

detecting another moving apparatus within a predetermined distance on a lateral side behind the moving apparatus; and causing the image data in a predetermined cut region, including the high-distortion region including the other moving apparatus behind on the lateral side, to be displayed as an enlarged image by a display device, in a case when the other moving apparatus behind on the lateral side is detected in the detecting of the moving apparatus, wherein the detecting detects a size of the other moving apparatus behind on the lateral side, and a size of the predetermined cut region to be displayed as the enlarged image by the display device is changed in accordance with the size of the other moving apparatus behind on the lateral side, and wherein, in a case when a focal distance of the optical system is defined as f, a half angle of view is defined as $\theta$, an image height on an image plane is defined as y, and a projection property representing a relationship between the image height y and the half angle of view $\theta$ is defined as $y(\theta)$, $y(\theta)$ in the low-distortion region is greater than $f \times \theta$ and is different from the projection property in the high-distortion region.

19. A non-transitory computer-readable storage medium configured to store a computer program comprising instructions for executing the following processes:

generating an image signal of a side behind a moving apparatus using an imaging device including an optical system configured to form an optical image, including a low-distortion region and a high-distortion region, on a light receiving surface;

generating image data from the image signal of the side behind the moving apparatus;

detecting a change in a traveling direction of the moving apparatus;

detecting another moving apparatus within a predetermined distance on a lateral side behind the moving apparatus;

causing the image data in a predetermined cut region, including the high-distortion region on a side of the changed traveling direction to be displayed, in a case when a change in traveling direction of the moving apparatus is detected in the detecting of the change in traveling direction; and causing the image data in a predetermined cut region, including the high-distortion region including the other moving apparatus behind on the lateral side, to be displayed as an enlarged image by a display device, in a case when the other moving apparatus behind on the lateral side is detected in the detecting of the moving apparatus, wherein the detecting detects a size of the other moving apparatus behind on the lateral side, and a size of the predetermined cut region to be displayed as the enlarged image by the display device is changed in accordance with the size of the other moving apparatus behind on the lateral side, and wherein, in a case when a focal distance of the optical system is defined as f, a half angle of view is defined as $\theta$, an image height on an image plane is defined as y, and a projection property representing a relationship between the image height y and the half angle of view $\theta$ is defined as $y(\theta)$, $y(\theta)$ in the low-distortion region is greater than $f \times \theta$ and is different from the projection property in the high-distortion region.

* * * * *